United States Patent [19]

Iwata et al.

[11] Patent Number: 5,085,248
[45] Date of Patent: Feb. 4, 1992

[54] FLOW CONTROL DEVICE

[75] Inventors: Kouichi Iwata; Katsuyoshi Fukaya, both of Oobu, Japan

[73] Assignee: Aisan Kogyo Kabushiki Kaisha, Aichi, Japan

[21] Appl. No.: 668,630

[22] Filed: Mar. 13, 1991

[30] Foreign Application Priority Data

Mar. 26, 1990 [JP] Japan .................................. 2-76491

[51] Int. Cl.⁵ ........................ F16K 1/44; F16K 11/02
[52] U.S. Cl. .................. 137/625.48; 251/129.05; 251/129.11
[58] Field of Search ............... 137/625.49, 625.34, 137/628, 625.12, 625.48

[56] References Cited

U.S. PATENT DOCUMENTS

| | | | |
|---|---|---|---|
| 790,962 | 5/1905 | Holzwarth | 137/625.12 |
| 2,542,390 | 2/1951 | Brown | 137/625.48 |
| 3,385,320 | 5/1968 | Fahie | 137/625.34 |

Primary Examiner—Arnold Rosenthal
Attorney, Agent, or Firm—Koda and Androlia

[57] ABSTRACT

A flow control device having a single valve body fixed to an operating shaft which is reciprocated by a single stepping motor to control the flow rate of air flowing two by-pass passages. Two air outlet ports and one air inlet port are formed in an air dispensing housing. Interior space of the housing is divided into two by-pass passages by a first valve seat. The valve body fixed to the operating shaft comprises a first valve portion for controlling the flow rate of air in cooperation with an opening formed in the first valve seat and a second valve portion for controlling the flow rate of air in cooperation with an opening of a second valve seat provided in the other air outlet port, the first and second valve portions being formed contiguously with each other.

4 Claims, 3 Drawing Sheets

FLOW CONTROL DEVICE

BACKGROUND OF THE INVENTION

1. FIELD OF THE INVENTION

The present invention relates to a flow control device and more particularly to a flow control device for controlling the flow rate of air passing through a by-pass air passage in an intake system of an internal combustion engine.

2. DESCRIPTION OF THE PRIOR ART

Heretofore, in flow control devices of this type there has been used a stepping moror 10 as an actuator, as shown in FIG. 1. With forward and reverse rotations of a rotor 16 of the motor 10, a shaft 80 reciprocates along the axis thereof.

A front end portion of the shaft 80 is positioned within a by-pass air passage 81, and a valve body 82 is provided on the shaft. The valve body 82 moves in contact with or awa from a valve seat 83 provided in the passage 81 in accordance with a reciprocating motion of the shaft 80. With this movement of the valve body 82, the flow path area of the passage 81 increases or decreases to control the amount of air to be supplied.

In the case where two or more by-pass air passages are required, there has been proposed a construction wherein a plurality of valve bodies for controlling the flow rate of air in those by-pass air passages are mounted on the shaft of a single stepping motor. With this construction, the flow rate control for by-pass air is simplified and the control accuracy is improved.

In the case where two or more valve bodies are provided on the shaft of a single stepping motor, the shaft is lenthened as compared with the case where a single valve body is provided on the shaft. As a result, the shaft is apt to vibrate accordingly, and upon exertion of a large external force on the shaft, the valve bodies may be repeatedly brought into contact with the respective valve seats in the by-pass air passages, resulting in that the valve bodies or the valve seats are worn out and the by-pass air flow rate controlling accuracy is deteriorated.

SUMMARY OF THE INVENTION

It is a primary object of the present invention to provide a flow control device for controlling the flow rate of fluid simultaneously with respect to each of at least two systems of fluid passages, using a single valve body fixed to a single actuator.

According to the present invention, a single actuator is housed in a casing, and an operating shaft which is actuated for axial reciprocating motion by said actuator is projected from the casing. A hiusing for fluid dispensing is fixed to the casing, and the projecting portion of the operating shaft from the casing is received in the interior space of the housing. The housing is provided with first and second fluid outlet ports and one fluid inlet port.

In the interior of the housing is provided a first valve seat having an opening between the first fluid outlet port and the fluid inlet port to divide the interior space of the housing into a first and second by-pass spaces. Further, a second valve seat having an opening is provided in association with the second fluid outlet port. The openings of the first and second valve seats are positioned concentrically with the operating shaft.

To the operating shaft is fixed a single valve body coaxially in a position within the housing. Said valve body is provided on the outer peripheral surface thereof with both a first valve portion for controlling the flow rate of fluid in cooperation with the opening of the first valve seat and a second valve portion for controlling the flow rate of fluid in cooperation with the opening of the second valve seat.

According to the present invention, both the flow rate of fluid flowing from the fluid inlet port formed in the housing toward the first fluid outlet port and the flow rate of fluid flowing from said fluid inlet port toward the second fluid outlet port can be controlled simultaneously by a single valve body which is actuated for reciprocating motion by a single actuator. The structure is simple.

DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
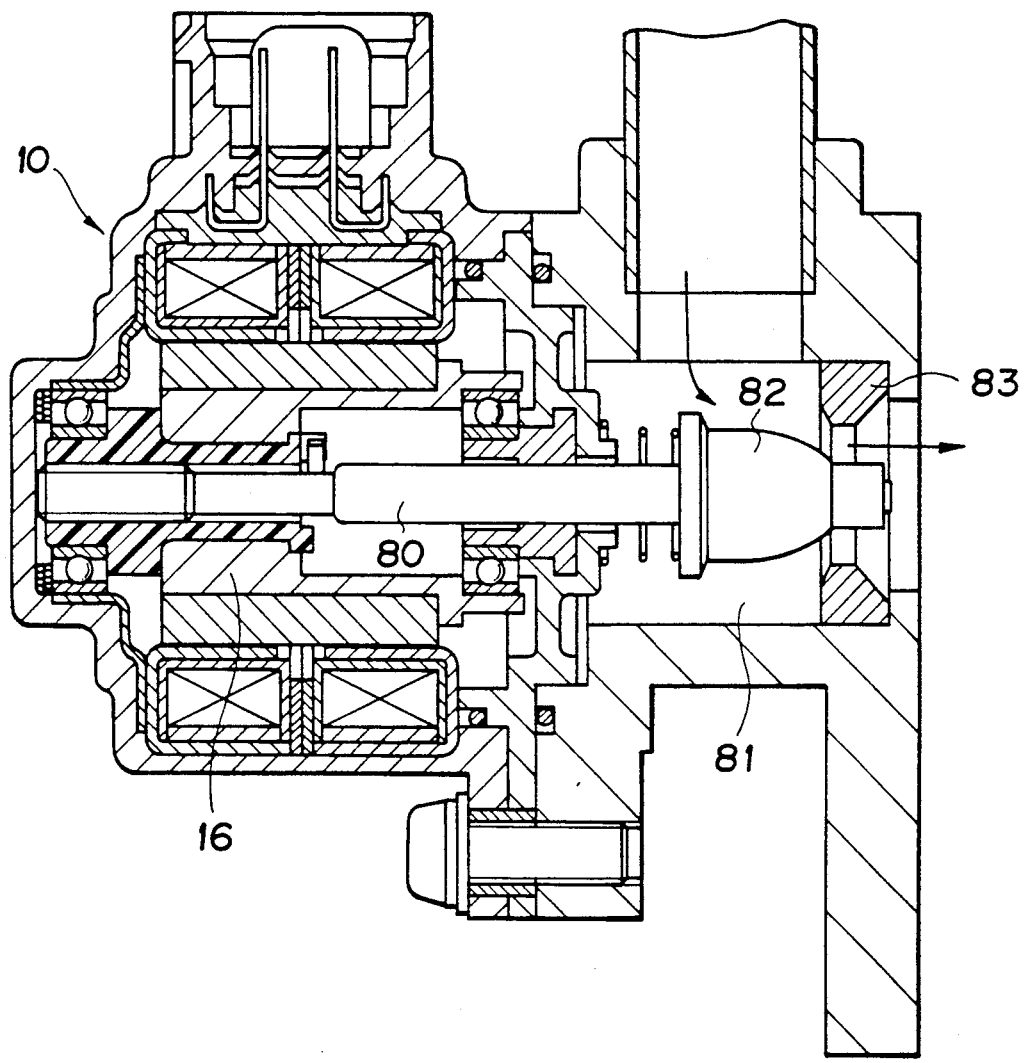
FIG. 1 is a sectional side view of a conventional flow control device.
Figure 2:
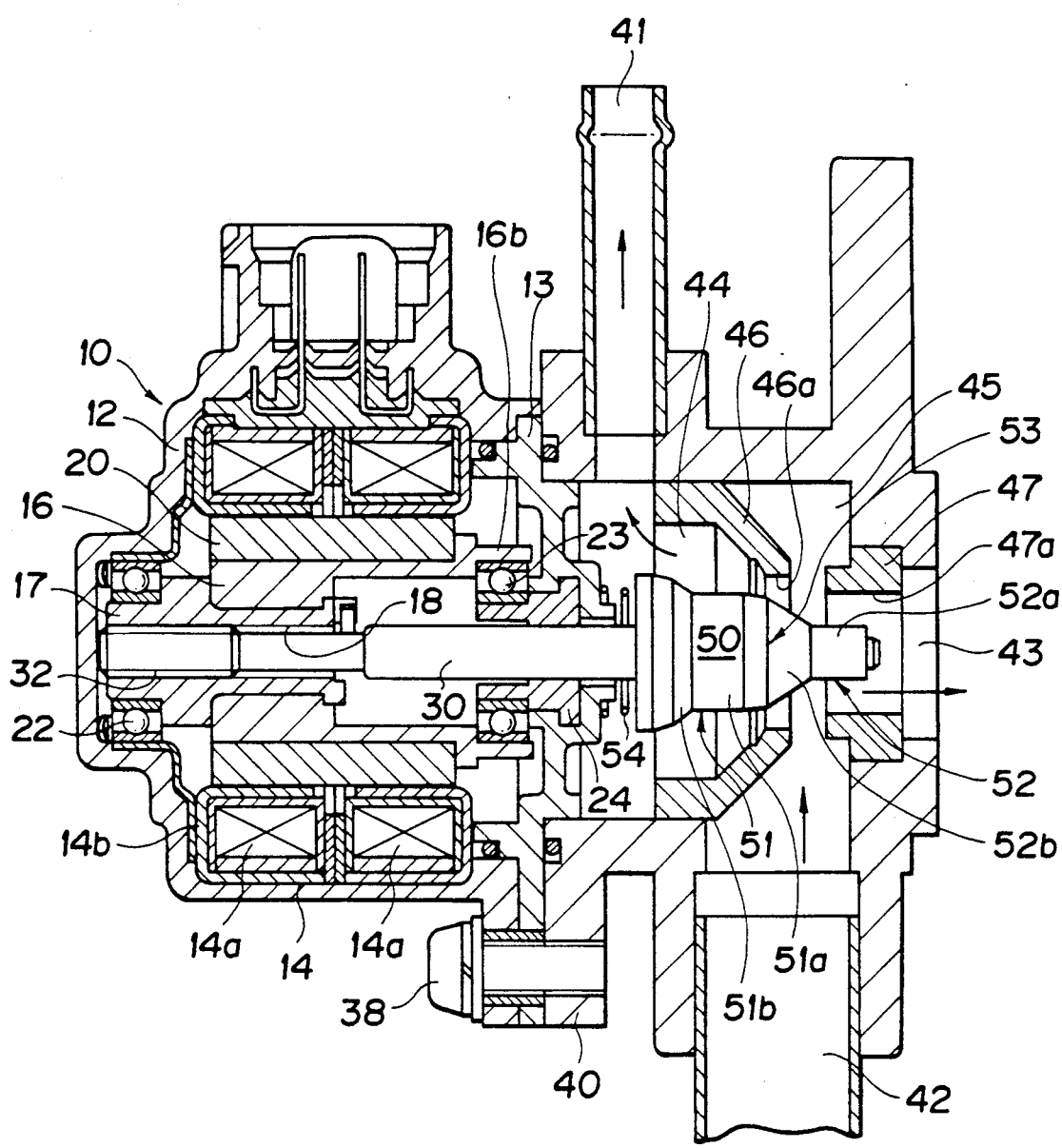
FIG. 2 is a sectional side view of an embodiment according to the present invention.
Figure 3:
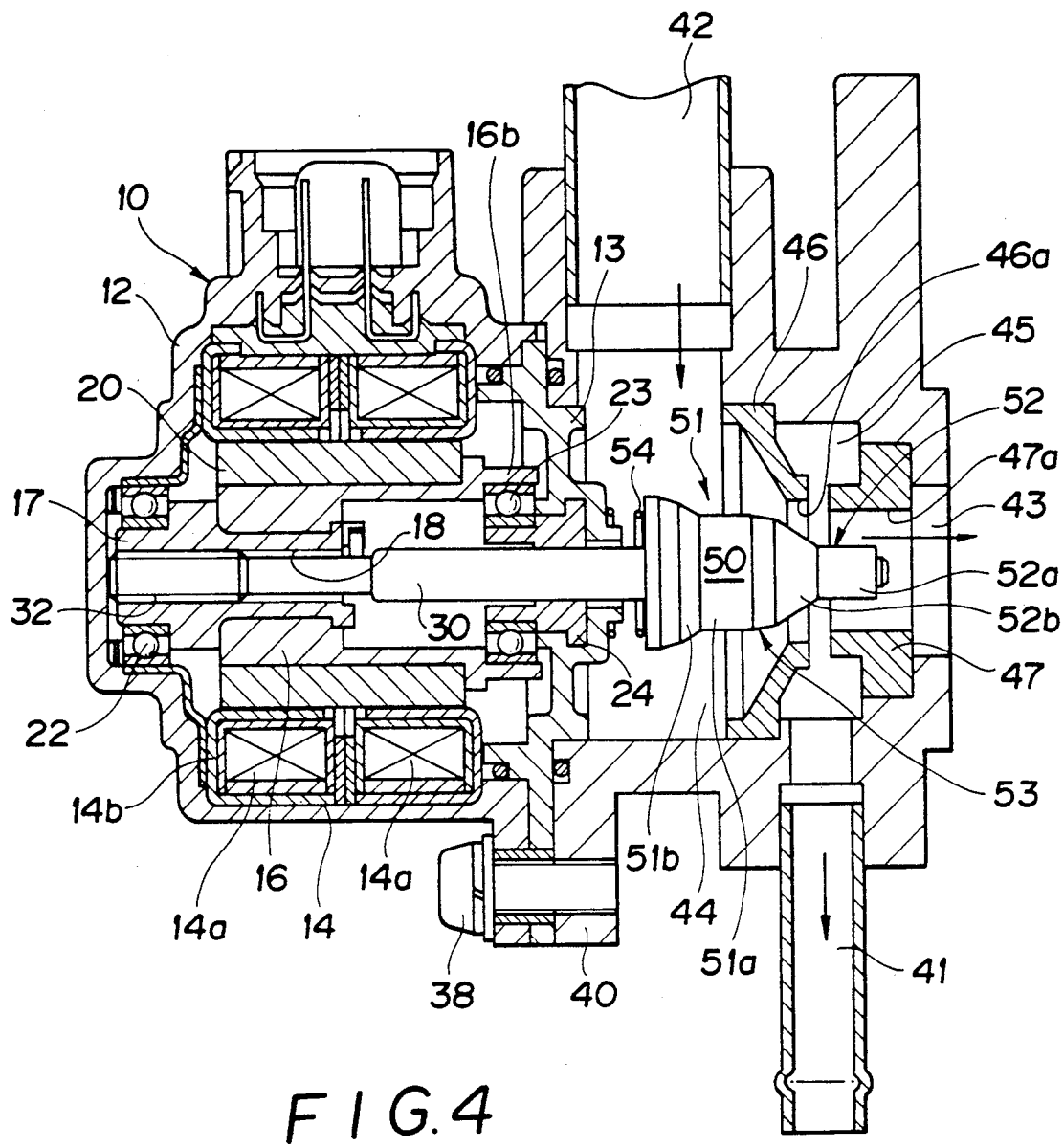
FIG. 3 is a sectional side view of another embodiment according to the present invention.

FIGS. 2 and 3 illustrate embodiments where a flow control device according to the present invention is applied to an idling revolution control system in an internal combustion engine.

In FIG. 2, a stepping motor 10 as an actuator is provided with a motor casing 12, a stator 14 incorporated in the interior of the motor casing 12 and a rotor 16 accommodated rotatably in a hollow portion of the stator 14. An opening of the motor casing 12 shown on the right-hand side in the figure is closed with a plate 13 after the stator 14 and the rotor 16 were mounted in the interior of the motor casing 12.

The stator 14 comprises a ring-like exciting coil 14a and a magnetic pole 14b. The rotor 16 is provided with a cylindrical magnet 20 provided on the outer periphery thereof and a cyclindrical supporting member 17 fitted in a central hole on the left-hand side in the figure. The magnet 20 has a plurality of north and south magnetic poles magnetized alternating on an outer periphery thereof.

The outer periphery of the supporting member 17 and the inner periphery of a sleeve portion 16b of the rotor 16 positioned on the right-hand side in the figure are supported rotatably to the motor casing 12 by ball bearings 22 and 23, respectively. As to the left-hand ball bearing 22, the outer race thereof is supported by the motor casing 12, while as to the right-hand ball bearing 23, the inner race thereof is supported by a sliding bearing 24 mounted on the plate 13 which is described later.

An operating shaft 30 is provided through the rotational center of the rotor 16. External threads 32 are formed on the outer peripheral portion of the operating shaft 30 near the left end in the figure and are threadedly engaged with internal threads 18 formed on the inner periphery of the central hole of the supporting member 17. Both threads 18 and 18 and 32 function as feed screws, and the operating shaft 30 is baffled on the motor casing 12 side by a means (not shown), so that with forward and reverse rotations of the rotor 16, the operating shaft 30 is not allowed to rotate together with the rotor 16 and only allowed to slide in the right and left directions in FIG. 2 along the axis thereof.

The operating shaft 30 extends rightwards in FIG. 2 from the interior of the motor casing 12 through the plate 13. A portion of the shaft 30 is supported slidably by the sliding bearing 24 which is fixed to the plate 13.

The motor casing 12 is connected to a housing 40 which constitutes a by-pass air passage in an intake system of an internal combustion engine, with the bolt 38 through the plate 13. The housing 40 has three ports, that is, a first fluid outlet port 41, a fluid inlet port 42 and a second fluid outlet port 43. In the interior of the housing 40, a first valve seat 46 having an opening 46a is disposed between the first fluid outlet port 41 and the fluid inlet port 42 to divide the interior of the housing 40 into a first by-pass space 44 and a second by-pass space 45. Further, in the housing portion where the second fluid outlet port 43 is formed, there is disposed a second valve seat 47 having an opening 47a. The openings 46a and 47a are positioned concentrically withthe operating shaft 30.

To the free end portion of the operating shaft 30 is fixed a valve body 50 concentrically with the same shaft. On the outer periphery of the valve body 50 there are formed both a first valve portion 51 for controlling the flow rate of air passing through the opening 46a of the first valve seat 46 in cooperation with the same opening 46a and a second valve portion 52 for controlling the flow rate of air passing through the opening 47a of the second valve seat 47 in cooperation with the same opening 47a, the first and second valve portions 51, 52 being axially adjacent to each other and concentric with the operating shaft 30. the first valve portion 51 comprises a cylindrical portion 51a having an outside diameter smaller than the inside diameter of the opening 46a and a conical portion 51b contiguous to the cylindrical portion 51a and capable of closing the opening 46a. The second valve portion 52 comprises a cylindrical portion 52a having an outside diameter smaller than the inside diameter of the opening 47a and a conical portion 52b contiguous to the cylindrical portion 52a and capable of closing the opening 47a. The cylindrical portion 51a of the first valve portion 51 is connected to a maximum diameter portion of the conical portion 52b of the second valve portion 52 through a conical intermediate portion 53 which is gradually reduced in diameter from an end of the cylindrical portion 51a toward the conical portion 52b of the second valve portion 52. As the valve body 50 is axially operated back and forth, the valve portions 51 and 52 approach to or leave from the openings 46a and 47a of the valve seats 46 and 47, respectively, whereby the flow rate of the by-pass air passing through the opening 46a and that of the by-pass air passing through the opening 47a are controlled simultaneously. In this controlled state, air enters the housing 40 from the fluid inlet port 42 and is discharged from the first and second fluid outlet ports 41, 43.

Between the plate 13 of the motor casing 12 and an end face of the valve body 50 is interposed a conical spring 54 which is concentric with the operating shaft 30. The resilience of the spring 54 functions to suppress an axial "wobbling" when the shaft 30 slides as described previously.

Ihn the flow control device having the above-noted construction, when an electric signal from an engine controller (not shown) is fed to the coil 14a of the stator 14 in the stepping motor 10, the rotor 16 rotates normally or reversely in accordance with the signal. As a result, the operating shaft 30 reciprocates in the right and left directions in FIG. 2 together with the valve body 50.

More particularly, when the rotor 16 rotates to move the operating shaft 30 rightwards in FIG. 2, each of the valve portions 51 and 52 formed on the valve body 50 approaches to respective opening formed in the respective valve seats 46 and 47, so that the flow path area of by-pass air flowing through each of the by-pass spaces 44 and 45 decreases gradually. When the delivery of the shaft 30 becomes maximum, the valve portions 51 and 52 are come into contact with the respective valve seats 46 and 47, to close the openings to isolae the by-pass spaces 44 and 45.

Upon reverse rotation of the rotor 16, the valve portions 50 and 51 move away from the openings in the valve seats 46 and 47, respectively, so that the flow path area for the by-pass air flowing through each of the by-pass spaces 44 and 45 increases gradually.

FIG. 3 illustrates another embodiment of the present invention. In this embodiment, the disposition of the fluid inlet port 42 and the first fluid outlet port 41 is changed in comparison with the embodiment illustrated in FIG. 2.

Figure 4:
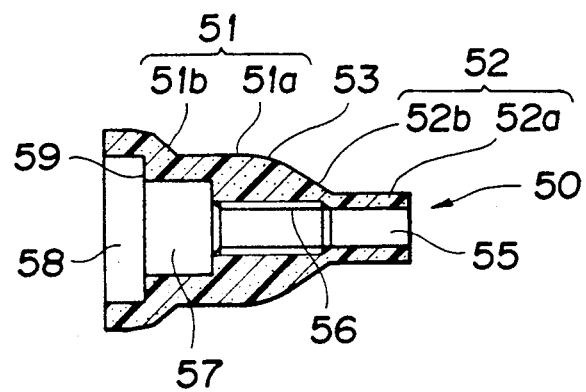
FIG. 4 is a sectional side view of a valve body used in the flow control device according to the present invention.

FIG. 4 illustrates in section the valve body 50 used in the move embodiments. The valve body 50 comprises the foregoing first and second valve portions 51 and 52 by a synthetic resin coaxially and integrally. Along the axis of the valve body 50 there is formed a stepped axial bore comprising first, second and third axial bores 55, 57, 58. The first axial bore is the smallest in inside diameter and has internal threads 56, which are engaged with external threads formed on a reduced diameter portion of the front end of the operating shaft 30, whereby said valve body 50 is threadedly fixed to the operating shaft 30 at the frond end thereof. The second axial bore 57, which is concentrically contiguous to the first axial bore 55, has an inside diameter larger than that of the first axial bore 55 and its size is determined so that the second axial bore 57 is fitted on the outer periphery of the central portion of the operating shaft 30. The third axial bore 58, which is concentrically contiguous to the second axial bore 57, is larger in inside diameter than the second axial bore 57 and has an annular stepped portion 59 at the boundary between it and the second axial bore 57. An end portion of the foregoing conical spring 54 is brought into pressure contact with the stepped portion 59.

According to the present invention, a single valve body is fixed to an operating shaft which is actuated for axial reciprocating motion by a single actuator, and first and second valve portions formed on the outer peripheral surface of said single valve body control the flow rate of fluid simultaneously in cooperation with openings of first and second valve seats provided within a fluid dispensing housing to distribute fluid from a fluid inlet port to first and second fluid outlet ports. Thus, it is possible to provide a flow control device of a simple construction capable of controlling the flow rate of fluid simultaneously with respect to each of two systems of fluid passages.

What is claimed is:

1. A flow control device comprising:
    a casing with a single actuator incorporated therein;
    an operating shaft projected from said casing and actuated for axial reciptocating motion by said actuator;
    a fluid dispensing housing fixed to said casing and having an interior space in which said projecting, operating shaft is accommodated, said fluid dispensing housing having first and second fluid outlet ports and a single fluid inlet port;
    a first valve seat provided within said housing in a position between said first fluid outlet port and said fluid inlet port to divide the interior space of the housing into first and second by-pass spaces, said first valve seat having an opening concentric with said operating shaft;
    a second valve seat provided within said housing in association with said second fluid outlet port and having an opening concentric with said operating shaft; and
    a single valve body fixed concentrically to said operating shaft in said housing and having two valve portions formed on the outer peripheral surface thereof contiguously with each other, said two valve portions being a first valve portion for controlling the flow rate of fluid in cooperation with the opening of said first valve seat and a second valve portion for controlling the flow rate of fluid in cooperation with the opening of said second valve seat.

2. A flow control device according to claim 1, wherein said first by-pass space is in communication with said first fluid outlet port, and said second by-pass space is in communication with both said second fluid outlet port and said fluid inlet port.

3. A flow control device according to claim 1, wherein said first by-pass space is in communication with said fluid inlet port, and said second by-pass space is in communication with both said first and second fluid outlet ports.

4. A flow control valve according to claim 1, wherein said valve body having said first and second valve portions formed on the outer peripheral surface thereof is threadedly fixed to external threads formed at the front end of said operating shaft, through internal threads formed on the inner wall surface of an axial bore which is formed coaxially through said valve portions and a spring in interposed concentric with said operating shaft between an end face of said valve body and a portion of said casing.

* * * * *